(12) United States Patent
Kamiya et al.

(10) Patent No.: US 6,591,704 B2
(45) Date of Patent: Jul. 15, 2003

(54) SHIFT ACTUATING CONTROL SYSTEM FOR SYNCHROMESH-TYPE AUTOMATIC TRANSMISSION

(75) Inventors: Mitsutoshi Kamiya, Kariya (JP);
Takeshige Miyazaki, Anjo (JP);
Yoshiyuki Aoyama, Nishio (JP);
Yoshihiro Ichikawa, Gihu (JP); Ryuji Choshi, Aichi-ken (JP)

(73) Assignee: Aisin Ai Co., Ltd., Nishio (JP)

( * ) Notice: Subject to any disclaimer, the term of this patent is extended or adjusted under 35 U.S.C. 154(b) by 1 day.

(21) Appl. No.: 09/967,999

(22) Filed: Oct. 2, 2001

(65) Prior Publication Data

US 2002/0038574 A1 Apr. 4, 2002

(30) Foreign Application Priority Data

Oct. 2, 2000 (JP) .................................. 2000-302584

(51) Int. Cl.$^7$ ............................................ F16H 61/26
(52) U.S. Cl. ........................................ 74/335; 74/336 R
(58) Field of Search ............................ 74/335, 336 R, 74/337, 473.11, 473.12

(56) References Cited

U.S. PATENT DOCUMENTS

| | | | |
|---|---|---|---|
| 5,157,607 A | * 10/1992 | Stainton et al. | ............. 74/336 R |
| 5,219,391 A | * 6/1993 | Edelen et al. | .................. 74/335 |
| 5,566,070 A | * 10/1996 | Mack et al. | ............... 74/336 R |
| 5,832,777 A | * 11/1998 | Weilant | ......................... 74/335 |
| 6,105,448 A | * 8/2000 | Borschert et al. | .............. 74/335 |

* cited by examiner

Primary Examiner—Sherry Estremsky
(74) Attorney, Agent, or Firm—Burns, Doane, Swecker & Mathis, LLP

(57) ABSTRACT

A shift actuating control system for a synchromesh-type automatic transmission includes a shift actuator having a driving portion activated depending on a shift operation, a shift fork shaft moving a sleeve of a synchromesh mechanism in an axial direction when engaged with the shift fork, and a driving force transmitting member disposed between the driving portion and the shift fork shaft to transmit the driving force generated by the driving portion to the shift fork shaft. The shift actuating control system for the synchromesh-type automatic transmission further includes a detector which detects the deflection of the driving force transmitting member when the driving portion is activated, and a controller which controls the driving portion depending on the deflection detected by the first detector.

18 Claims, 5 Drawing Sheets

Fig. 5 KNOWN MECHANISM
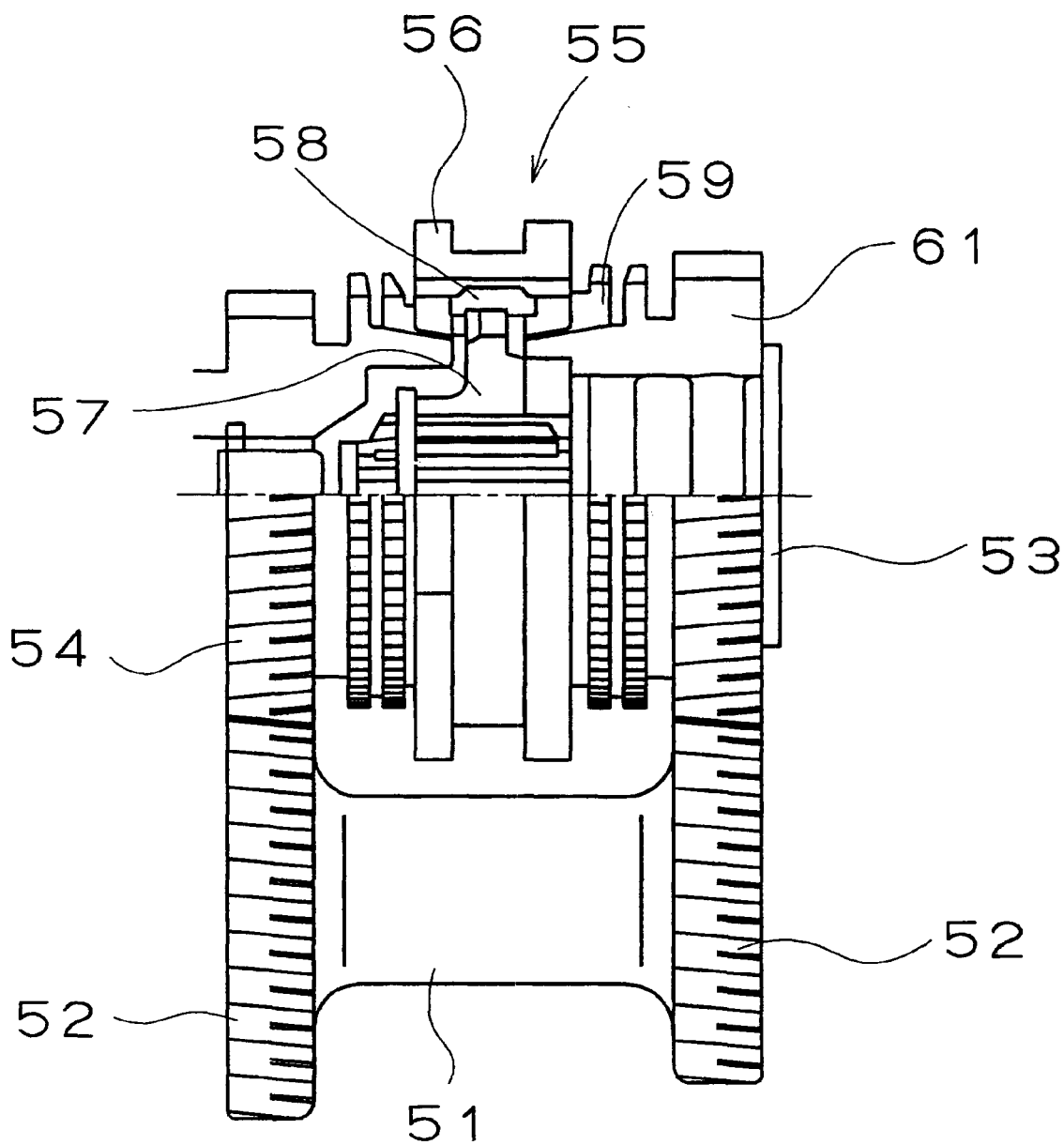

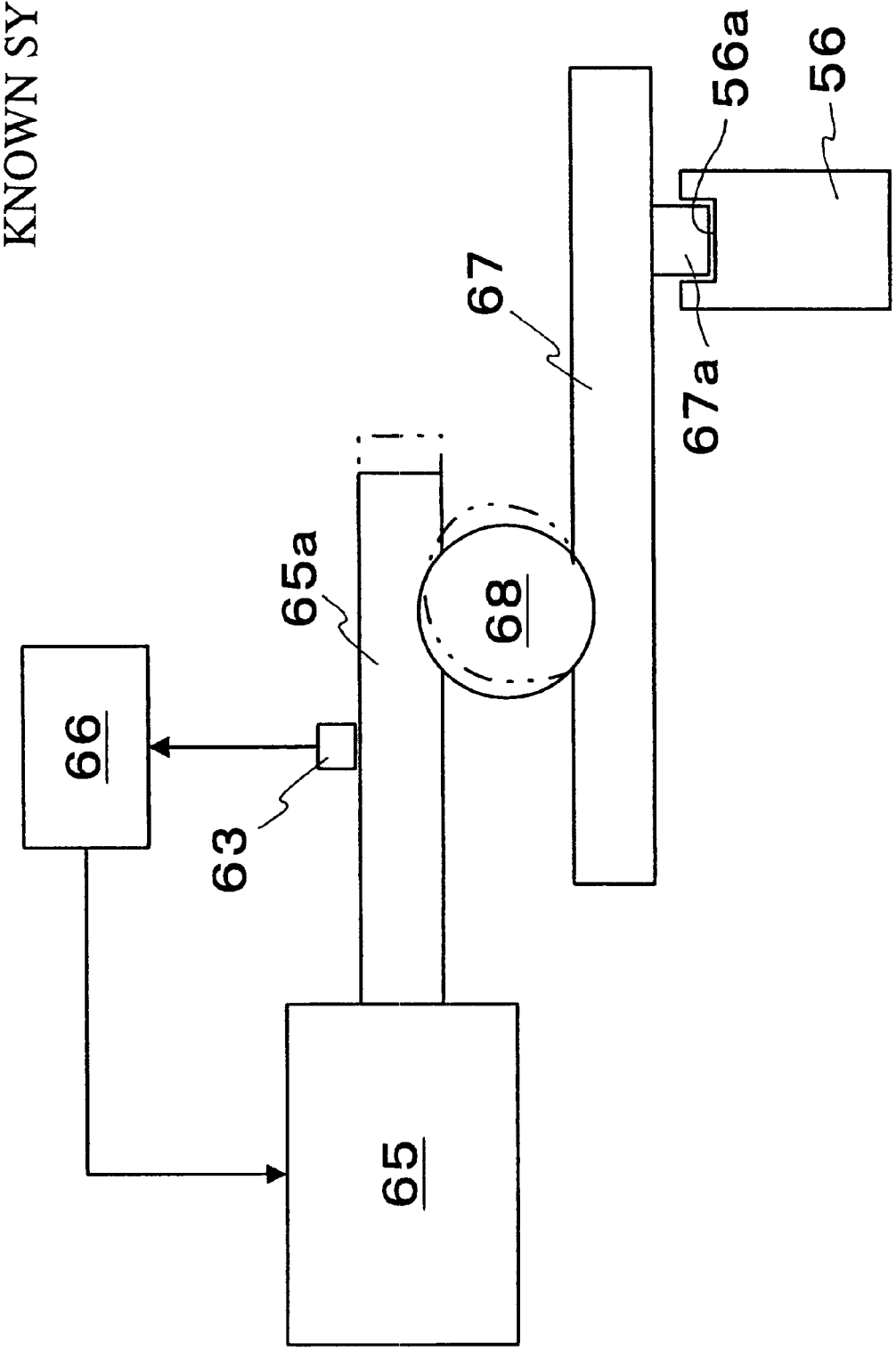
Fig. 6 KNOWN SYSTEM

SHIFT ACTUATING CONTROL SYSTEM FOR SYNCHROMESH-TYPE AUTOMATIC TRANSMISSION

This application is based on and claims priority under 35 U.S.C. §119 with respect to Japanese Patent application No. 2000-302584 filed on Oct. 2, 2000, the entire content of which is incorporated herein by reference.

FIELD OF THE INVENTION

This invention generally relates to a control system applied in a synchromesh type automatic transmission. More specifically, this invention pertains to a control system which controls a shift actuator that drives a sleeve in a synchromesh type automatic transmission.

BACKGROUND OF THE INVENTION

Generally speaking, vehicles such as cars, buses, and the like are driven by a driving power source such as a gasoline engine or an electric motor. The vehicle is provided with a transmission for producing a preferable vehicle driving condition in response to the vehicle running condition.

The transmission is designed to change and select a combination of gears to generate torque or speed. Transmissions are basically categorized into automatic transmissions (AT) or manual transmissions (MT). In the case of automatic transmissions, the transmission automatically selects the combination of gears and the timing for changing the gears.

As shown in FIG. 5, manual transmissions (MT) are typically comprised of a counter shaft 51 (input shaft), a plurality of counter gears 52, a main shaft 53 (output shaft), a plurality of idle gears 54, and a synchromesh mechanism 55 that includes a sleeve 56. Driving power is supplied to the counter shaft 51 from the driving source such as the gasoline engine. The counter gears 52 are mounted on the counter shaft 51. The main shaft 53 outputs the driving power to the wheels via a propeller shaft and other parts. The idle gears 54 are freely rotatably provided on the main shaft 53 and mesh with the counter gears 52.

In vehicles provided with the known manual transmission (MT), a predetermined speed-change gear is selected based on a manual shift operation performed by the driver. Upon the manual shift operation of a shift lever by the driver, an operating force applied to the shift lever is transmitted to a shift fork shaft via a cable and other parts. The sleeve 56 is moved by the shift fork shaft to effect contact of an idle gear 54 with an output shaft for rotating the output shaft.

Recent developments have led to an automatic manual transmission that is structurally based on the manual transmission (MT). As schematically shown in FIG. 6, the manual transmission performs the shift operation by a shift actuator 65 to relieve the driver of the manual operating requirements.

With the automatic manual transmission, the shift lever is operated to transmit the driver's request to an electronic control unit ECU 66. The ECU 66 controls the timing and the amount of activation of the shift actuator 65. The output from the shift actuator 65 is transmitted to a shift fork shaft 67 via inner levers 68. The inner levers 68 are provided between a driving shaft 65a that is included in or formed by the shift actuator 65 and the shift fork shaft 67. The inner levers are formed by an inner lever, an interlock plate, and a shift head.

Immediately after the shift actuator 65 is activated, the fork shaft 67 is axially moved via the inner levers 68. The sleeve 56 is integrally moved with the shift fork shaft 67 by the engagement between a projecting portion 67a formed on the shift fork shaft 67 and an engaging groove 56a defined in the circumferential outer surface of the sleeve 56. According to the aforementioned automatic manual transmission, when the sleeve 56 and the shift fork shaft 67 are moved by the shift actuator 65 via the inner levers 68 while a synchronizing operation is being performed, it is important to determine a shift position, i.e., the driving amount of the shift fork shaft 67 and the sleeve 56.

As seen in FIG. 5, the sleeve 56 included in the synchromesh mechanism 55 is meshed with splines defined in a synchronizer hub 57 which rotates integrally with the main shaft 51. When the driving force from the shift fork shaft 67 is applied to the sleeve 56 in the rightward direction in FIG. 5, the edge surface of a synchronizer key 58 pushes a synchronizer ring 59 against a cone portion (formed at left side in FIG. 5) of the idle gear 61. Accordingly, the rotation of the idle gear 61 is gradually synchronized with the rotation of the sleeve 56.

According to further movement of the sleeve 56, the sleeve 56 is disengaged from the synchronizer key 58, and directly pushes the synchronizer ring 59. The rotation of the idle gear 61 becomes equal to the rotation of the sleeve 56 so that the idle gear 61 is synchronized with the sleeve 56.

Hereinafter, the synchronizer ring 59 rotates independently, and does not hinder the idle gear 61 from axially moving. Therefore the sleeve 56 passes through the synchronizer ring 59 and is completely engaged with the idle gear 61, whereby the sifting operation is completed.

If the moving amount of the sleeve 56 is larger than a required amount, unexpected reactive forces are generated between the members of the synchromesh mechanism 55 (i.e., the sleeve 56, the synchronizer key 58 and the synchronizer ring 59) and the idle gear 61. Thus, one or more parts of the synchromesh mechanism 55 can become worn, thus decreasing the endurance or longevity of the mechanism.

On the other hand, if the moving amount of the sleeve 56 is smaller than the required amount, the reliable synchronizing operation may not be performed.

Accordingly, it is necessary to accurately control the moving amount of the shift fork shaft 67 or the sleeve 56 from the standpoint of the increasing the durability of the synchromesh mechanism 55 while also producing reliable synchronizing operation.

It is possible to provide position sensors adjacent the shift fork shaft 67 of the sleeve 56 when the automatic manual transmission is manufactured (and assembled) for detecting the moving amount of the shift fork shaft 67. However, the sleeve 56 and the shift fork shaft 67 are positioned far inside the housing of the synchromesh-type automatic transmission and so it is difficult to provide the position sensors adjacent the sleeve 56 and the fork 67. Thus, from the standpoint of manufacturing cost and manufacturing time, it may be unreasonable or unfeasible to provide position sensors adjacent the sleeve 56 and the shift fork shaft 67.

In an attempt to overcome the aforementioned drawback, the position sensor 63 can be disposed adjacent the driving shaft 65a to detect the moving amount of the driving shaft 65a. The moving amount of the driving shaft 65a detected by the position sensor 63 can then be inputted to the ECU 66, with the ECU 66 then regulating the moving amount of the fork 67 and the sleeve 56.

However, with this alternative placement of the position sensor, the moving amount of the shift fork shaft 67, i.e., the sleeve 56, cannot be accurately detected to a sufficient degree because the inner levers 68 disposed between the driving shaft 65a and the shift fork shaft 67 deflect under the driving force and this deflection exerts a bad influence upon the moving amount of the sleeve 56.

Therefore the moving amount of the driving shaft 65a detected by the position sensor 63 will differ from the actual moving amount of the shift fork shaft 67. Owing to the difference between the detected moving amount and the actual moving amount, the control of the moving amounts of the shift fork shaft 67 and the sleeve 56 for purposes of properly stopping the shift fork shaft 67 and the sleeve 56 cannot be accurately ascertained. Thus, various members forming the synchromesh mechanism can become worn and reliable synchronizing operation may not be performed.

SUMMARY OF THE INVENTION

A shift actuating control system for a synchromesh-type automatic transmission includes a shift actuator having a driving portion activated depending on a shift operation, a shift fork shaft moving a sleeve of a synchromesh mechanism in an axial direction when engaged with the shift fork, and a driving force transmitting member disposed between the driving portion and the shift fork shaft to transmit the driving force generated by the driving portion to the shift fork shaft. The shift actuating control system for the synchromesh-type automatic transmission further includes a detector which detects the deflection of the driving force transmitting member when the driving portion is activated, and a controller which controls the driving portion depending on the deflection detected by the first detector.

According to another aspect of the invention, a shift actuating control system for a synchromesh-type automatic transmission includes a shift actuator having a driving portion activated by shift operation to generate a driving force, a shift fork shaft which axially moves a sleeve, a driving force transmitting member disposed between the driving portion and the shift fork shaft to transmit the driving force generated by the driving portion to the shift fork shaft, and a load sensor which detects the driving force transmitted by the driving portion to the shift fork shaft. A converting mechanism converts the driving force detected by the load sensor to a deflection of the driving force transmitting member, and a controller controls the shift actuator based on the deflection of the driving force transmitting member.

Another aspect of the invention involves a method of controlling shift actuation in a synchromesh-type automatic transmission that includes a shift actuator having a driving portion activated by shift operation to generate a driving force, a shift fork shaft which moves a sleeve, and a driving force transmitting member disposed between the driving portion and the shift fork shaft to transmit the driving force generated by the driving portion to the shift fork shaft. The method involves detecting a deflection of the driving force transmitting member when the driving portion is activated, and controlling the driving portion based on the detected deflection.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein:

FIG. 5 is front view of a general synchromesh mechanism, partially in cross-section; and FIG. 6 is a schematic illustration of a known shift actuating control system for a synchromesh-type automatic transmission.

DETAILED DESCRIPTION OF THE INVENTION

Generally speaking, the shift actuating control system for a synchromesh type automatic transmission in accordance with the present invention includes the combination of a shift actuator, a shift fork shaft, a driving force transmitting member, a detecting mechanism and a controller. Each of these features is described below.

The shift actuator is primarily constituted by a fixed portion that is fixed relative to the vehicle body and a moving portion (i.e., a driving portion). The driving portion is movable or operable to shift or rotate relative to the fixed portion. An electric motor can be employed for the driving portion so that the driving portion rotates relative to the fixed portion. A hydraulic cylinder and an air cylinder can also be employed for the driving portion so that the driving portion linearly shifts relative to the fixed portion.

The shift fork shaft is engaged with a sleeve that is included in the synchromesh mechanism. The shift fork shaft is axially and bidirectionally movable. As the shift fork shaft is moved in one direction or the other direction, the sleeve is moved toward one of the idle gears disposed in the one direction or the other direction relative to the sleeve. The sleeve thus integrates the one idle gear with the output shaft. Accordingly, the input shaft is connected to the output shaft via the counter gear and the idle gear, whereby the predetermined speed-change gear is selected.

The driving force transmitting member is disposed between the driving portion and the shift fork shaft. A driving force from the driving portion is transmitted to the shift fork shaft via the driving force transmitting member. The driving force transmitting member can be in the form of transmitting members, including an inner lever, an interlock plate and a shift head. The inner lever is mounted to the fixed portion so that the inner lever does not move or rotate with the driving portion. The interlock plate is formed to enclose the inner lever and is rotatably movable around the inner lever. The shift head is formed on the shift fork shaft. Each of the transmitting members has a predetermined profile so that an elastic coefficient of each member can be determined based on the material from which it is manufactured, the cross-sectional area and the length.

The detecting mechanism or detecting means is adapted to detect the deflection of the driving force transmitting member or transmitting members. This deflection results from the driving force when the shift fork shaft is moved. The detecting means can directly detect the deflection of the transmitting members. If it is difficult to directly detect the deflection of the transmitting members, the detecting means can be designed to detect the deflection using a detecting portion and a converting portion.

Figure 2:
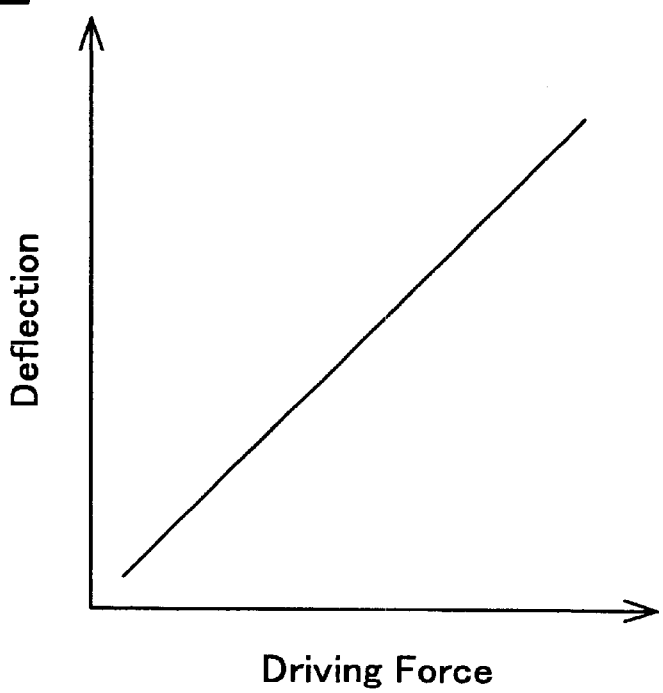
FIG. 2 is a driving force/deflection map that is employed in the control system of the present invention.

The detecting portion of the detecting means detects the driving force transmitted to the driving portion of the shift actuator or the transmitting member, and can be in the form of a load sensor or other suitable detector. Using a map such as that shown in FIG. 2 which sets forth the relationship between the driving force and the deflection, the converting portion of the detecting means then determines the deflection based on the driving force detected by the detecting portion.

The converting portion can also convert the driving force into the deflection of the transmitting members, taking into account the friction resistance generated between rotating members in the electric motor or the friction resistance generated between the sliding shaft and the cylinder in the hydraulic cylinder. The frictional resistance does not contribute to the driving force, but is included in the driving force that is detected by the detecting portion. Thus, to convert the driving force to deflection of the transmitting members, the converting portion subtracts the friction resistance from the driving force, whereby the driving force actually contributing to the drive of the driving portion is determined. Based on the driving force actually contributing to the drive of the driving portion, the converting portion can accurately ascertain the positions of the shift fork shaft and the sleeve.

Further, the converting portion can more accurately determine the deflection of the transmitting members by using a map taking into account hysteresis in converting the driving force into the deflection. Such a map can include different characteristics when the driving force is increasing and decreasing.

The controller or control means performs a control operation to control the shift actuator based on the detected or determined deflection of the transmitting members. If the detecting means directly detects the deflection of the transmitting member, the control means controls the shift actuator based on the deflection directly detected by the detecting means. On the other hand, if the detecting means (first detecting means) is provided with the detecting portion and the converting portion as described above, another detecting means (i.e., second detecting means) can be utilized. This second detecting means, for example a position sensor, can be provided separately from the control means to detect the moving amount of the driving portion. A correcting portion included in the control means corrects the moving amount of the driving portion based on the deflection which is detected by the converting portion (or the correcting portion subtracts the deflection of the transmitting members from the moving amount, for example). Therefore, the control means controls the activity (e.g., shifting amount, revolution, etc.) of the shift actuator depending on the moving amount of the driving portion which is corrected by the correcting portion. By way of example, the control means can be formed as an electronic control unit (ECU).

As described above, the first detecting means can be comprised of the detecting portion and the converting portion. It is to be understood, however, that the first detecting means can be formed by only the detecting portion rather tahn being comprised of both the detecting portion and the converting portion. The converting portion can be included in the control means. The point is that the shift actuating control system described here is designed to include the first detecting portion which detects the deflection of the transmitting members when the shift fork shaft is moved and the control means which controls the shift actuator depending on the deflection detected by the first detecting means. The system can also be designed so that the control means includes the second detecting portion which detects the moving amount of the driving portion when the shift fork shaft is driven, the detecting portion which detects the driving force applied to the driving portion, the converting portion which determines the deflection of the transmitting members based on the driving force detected by the detecting portion, and the correcting portion which corrects the moving amount of the driving portion detected by the second detecting means depending on the deflection found by the converting portion.

Figure 1:
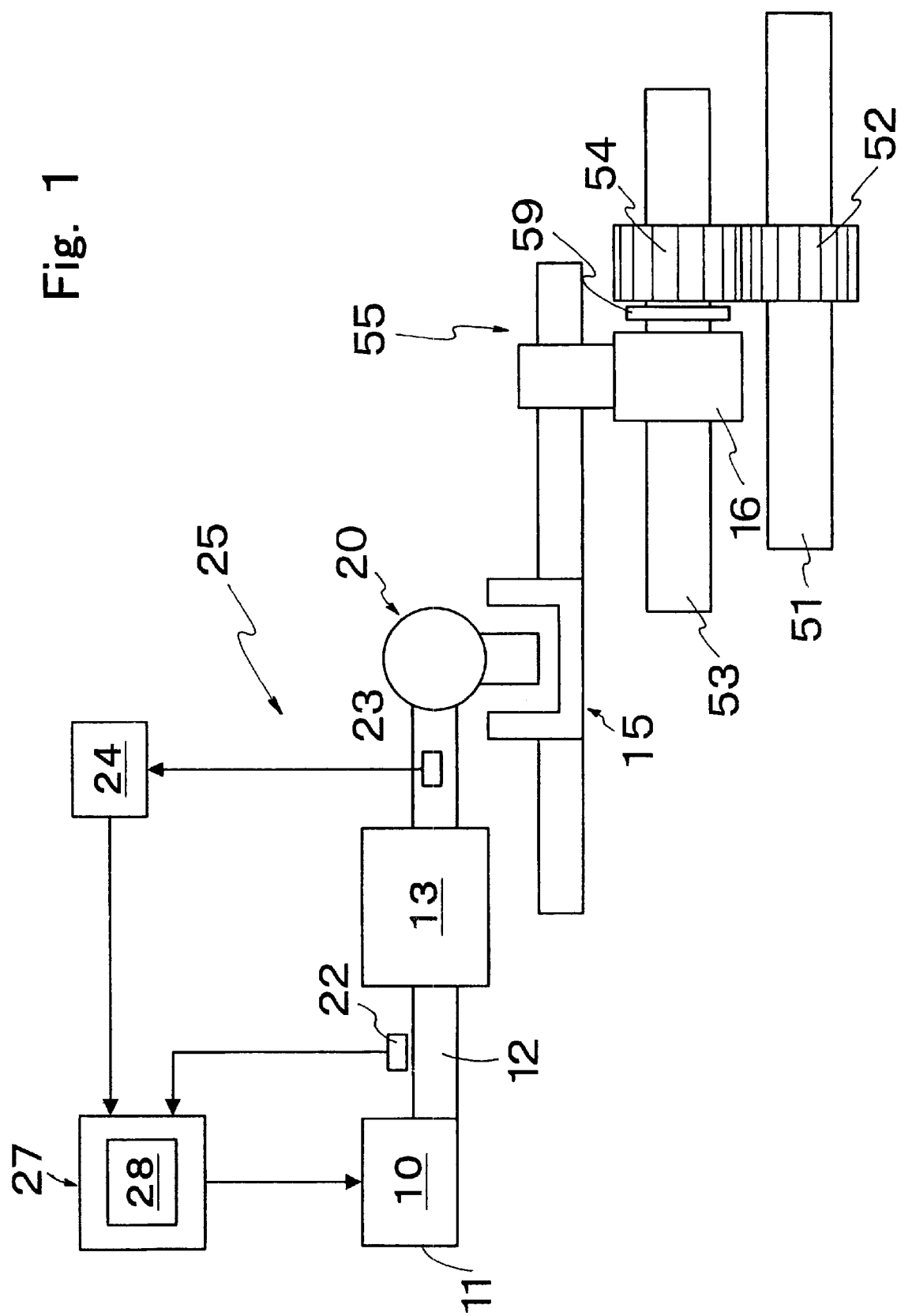
FIG. 1 shows is a schematic illustration of a shift actuating control system for a synchromesh-type automatic transmission in accordance with the present invention.

Referring now to FIG. 1, the synchromesh type automatic transmission associated with the described version of the present invention includes a counter shaft 51, a counter gear 52, a main shaft 53, an idle gear 54, and a synchromesh mechanism 55 including a sleeve 16. The counter gear 52 is mounted on the counter shaft 51 while the idle gear 61 is idly supported about the main shaft 53. The actuating control system for the synchromesh type automatic transmission includes a hydraulic cylinder 10, a shift fork shaft 15, inner levers 20 (an inner lever, an interlock plate and a shift head), a position sensor 22, a load sensor 23, a converting portion 24, and an electronic control unit ECU 27, The hydraulic cylinder 10 constitutes the shift actuator and is comprised of a cylinder 11 and a piston 12 at which is provided a reduction gear 13. The piston 12 which constitutes the driving portion is linearly movable relative to the cylinder 11. The shift fork shaft 15 is axially movable and includes a projection formed thereon. The projection is engageable with an engaging portion defined in the sleeve 16. The inner levers 20 (transmitting members) are provided between the piston 12 the shift fork shaft 15, and transmit linear movement of the piston 12 to the shift fork shaft 15. Accordingly, the shift fork shaft 15 and the sleeve 16 are moved by the movement of the piston 12 via the inner levers 20.

The position sensor 22 (a second detecting portion) is provided adjacent the piston 12 to detect a moving amount of the piston 12 or a shift position of the piston. The position sensor 22 transmits a signal indicating the detected moving amount to a correcting portion 28 included in the ECU 27. The load sensor 23 is provided on the piston 12 and detects the driving force supplied with the inner levers 20. The load sensor 23 transmits the detected driving force to the converting portion 24. The converting portion 24 calculates the deflection corresponding to the detected driving force based on a driving force/deflection map shown in FIG. 3, and transmits the calculated deflection to the correcting portion 28. The load sensor 23 and the converting portion 24 constitute a first detecting means 25.

Figure 4:
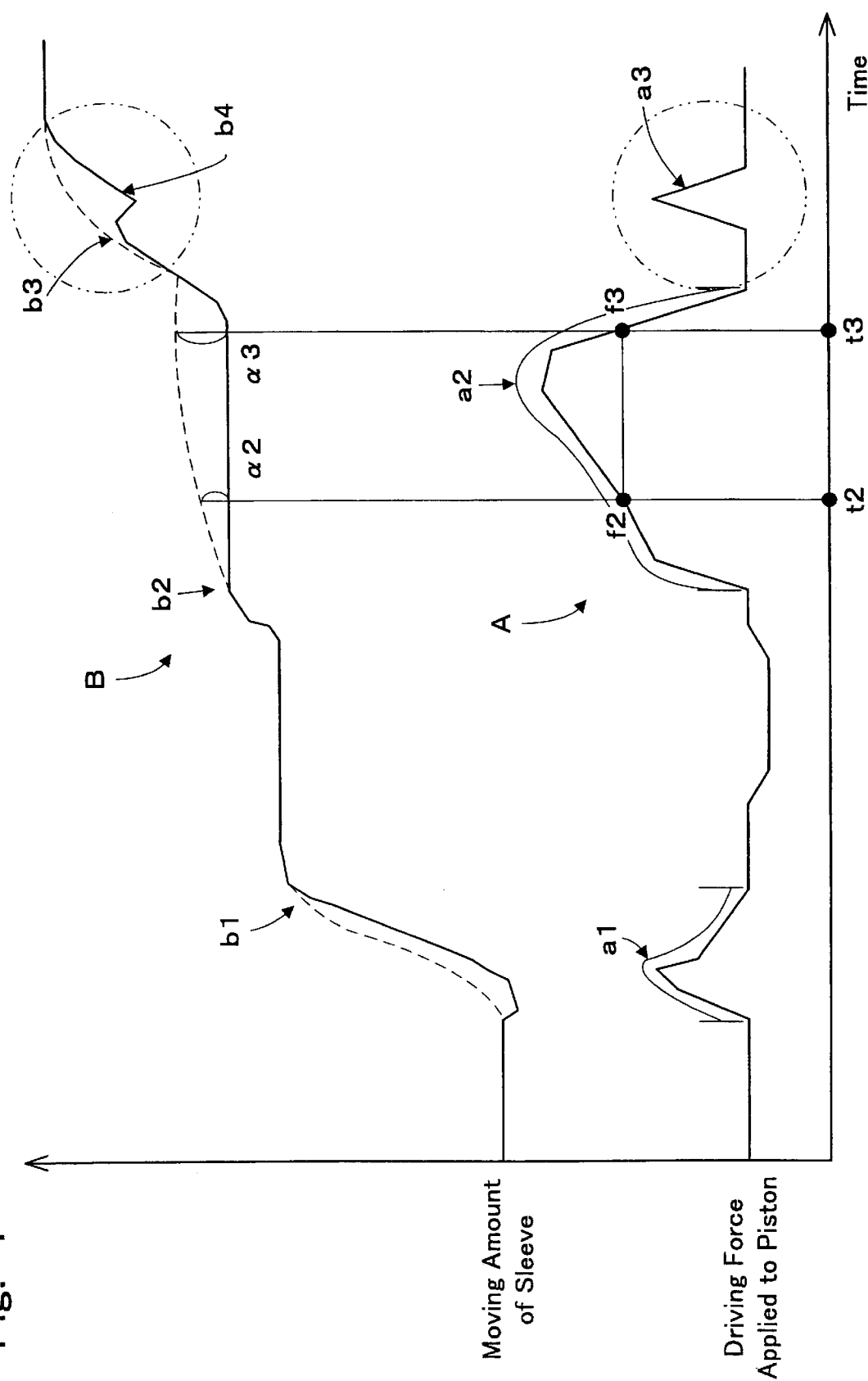
FIG. 4 is a graph illustrating the relationship between the driving force of the sleeve and the deflection of the inner levers.

Set forth below is a description of the operational control for controlling the output of the ECU 27, using the moving amount detected by the position sensor 22 and the deflection determined by the load sensor 23 and the converting portion 24, based on curves varying with time as shown in FIG. 4. The lateral axis or x-axis in FIG. 4 shows the time, and the vertical axis or y-axis shows the driving force applied to the piston 12 and the moving amount (or shift position) of the sleeve 16.

The curve identified as A in FIG. 4 relates to the driving force supplied to the piston 12 and illustrates the increment of the driving force at portions a1 and a2. The portion a1 corresponds to the time when the piston 12 starts to move, overcoming the frictional resistance generated between the piston 12 and the cylinder 11. In other words, portion a1 corresponds to the time when the coefficient of static friction between the cylinder 11 and the piston 12 is exchanged for or changed to the coefficient of dynamic friction. The portion a2 corresponds to the time when the sleeve 16 is in contact with a synchronizer ring 59 illustrated in FIG. 1. The other portions of the curve A, other than the portion designated a3, are generally relatively flat, meaning that the driving force is only used to slide the sleeve without the need for overcoming the friction force or the reaction force from the synchronizer ring. A small driving force is thus satisfactory at these points.

The curve identified as B in FIG. 4 relates to the moving amount or the shift position of the sleeve 16, with the dashed line portions of curve B showing the moving amount of the sleeve 16 detected by the position sensor 22. The sleeve 16 is moved relatively significantly at the portion b1 corresponding to the portion a1 in curve A. In contrast, the sleeve 16 is only slightly moved at the portions b2, b3 corresponding to the initial stage and the later stage of the portion a1, respectively. The portion b1 corresponds to the time when the sleeve 16 is disengaged from one of the idle gears rotating with the main shaft in one speed-change, and so the members in the synchromesh mechanism 55 do not hinder the sleeve 16 from moving, thus allowing the sleeve 16 to move rather significantly. The portion b2 of the curve B corresponds to the time when the sleeve 16 is in a neutral position in contact with a ring 59 shown in FIG. 1, referred to as a balk point. The portion b3 of the curve B corresponds to the time when the counter gear 52 directly engages the idle gear 54.

In the curve designated B, the real line or solid line shows the moving amount of the sleeve 16 which is corrected by the correcting portion 28 included in the ECU 27.

As can be seen through a comparison of the solid line and the dashed line portions in curve B, the correcting portion 28 estimates the small moving amount of the sleeve 16 near the peaks at the portions a1 and a2 corresponding to the time when the driving force applied to the piston 12 is increased at the portions a1 and a2.

Figure 3:
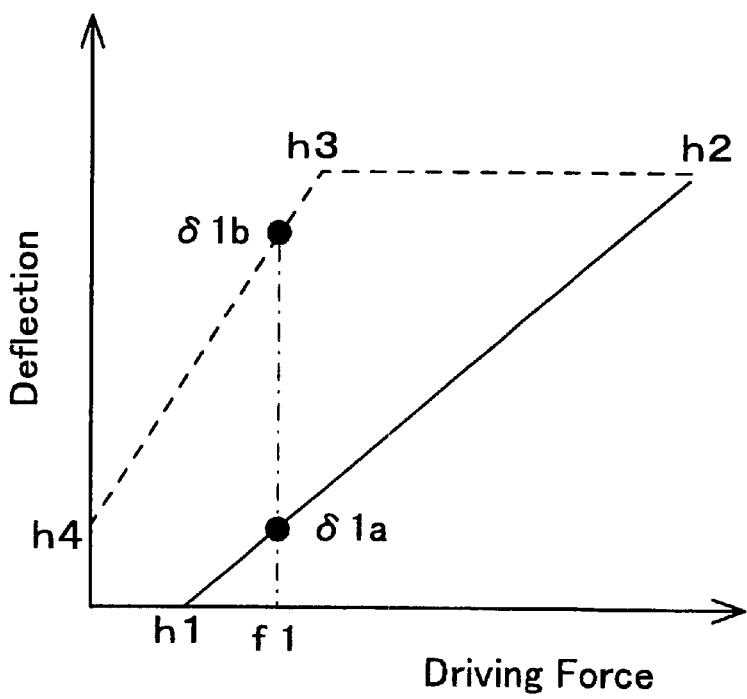
FIG. 3 is a driving force/deflection map that is employed in the control system of the present invention.

More specifically, the converting portion 24 calculates the deflection of the inner levers 20 based on the driving force supplied to the piston 12 as detected by the sensor 23 and using the driving force/deflection map shown in FIG. 3. With this conversion by the converting portion 24, when the driving force is increasing, the converting portion 24 calculates the deflection based on the solid line of the driving force/deflection map shown in FIG. 3. When the driving force is decreasing, the converting portion 24 calculates the deflection based on the dashed line shown in FIG. 3. Accordingly, although both deflections δ 1a, δ 1b correspond to the same driving force f1, the deflection δ 1a is utilized when the driving force supplied to the piston 12 is increasing, while the deflection δ 1b, which is larger than the deflection δ 1a, is utilized when the driving force to the piston 12 is decreasing. The reason is because the driving force/deflection characteristics of the inner levers 20 are affected by the hysteresis as described below.

The deflection of the inner levers 20 increases from the point h1 to the point h2 when the driving force applied to the inner levers 20 is increasing, and the deflection decreases from the point h2 to the point h4 through the point h3 when the driving force is decreasing. More specifically, as the driving force increases, the inner levers 20 become deformed in proportion to the amount of the driving force, whereby the deflection increases along the path from the point h1 to the point h2. When the driving force is decreasing, the deflection initially does not decrease as shown in the path between the point h2 and the point h3 because the driving force is balanced by the reaction force of the inner levers 20. Immediately after these forces become unbalanced, the deformation decreases along the path between the point h3 and the point h4. Thus, the rates of increase (or decrease) of the above deflection when the deflection is increasing differs from that when the deflection is decreasing as shown in FIG. 3. Accordingly, the deflection δ 1 differs from the deflection δ 2 corresponding to the same amount of driving force.

The deflection at the point h4 in FIG. 4 corresponds to the driving force which is increasing to make the sleeve 16 directly push the synchronizer ring (not shown in FIG. 1) against a cone portion of an idle gear (not shown in FIG. 1) for a synchronizing operation. The deflection at the point b5 corresponds to the driving force which is decreasing when the sleeve 16 is at the moment to pass through the synchronizer ring because the synchronizer ring has already been synchronized with the sleeve 16 and thus does not prevent the passage of the sleeve 16.

As can be seen from the curve B between the point b4 and the point b5, the sleeve 16 is slightly moved, but the moving amount of the piston 12 is increased as shown by the dashed line corresponding to the above portion of the curve B. Then it is necessary to estimate the deflection of the inner levers 20 for correcting the moving amount of the sleeve 16.

Describing further the above-mentioned hysteresis with reference to the illustration in FIG. 4, at both ends of the portion a1 of the curve A, the driving force f2 is equal to the driving force f3, but the respective deflections found by the converting portion 24 differ from one another. Therefore, the corrections α 2 and α 3 found by the correcting portion 28 differ in amount as shown in the portion b2 of the curve B.

The converting portion 24 calculates the deflection using the driving force, with the friction resistance of the piston 12 sliding in the cylinder 11 being subtracted from the output generated by the hydraulic cylinder 10. The friction resistance of the piston 12 can be measured by activating the hydraulic cylinder 10 without connecting the piston 12 with the inner levers 20.

Based on the aforementioned corrections, the ECU 27 controls the activity of the hydraulic cylinder 10, i.e., the moving amount of the piston 12. Accordingly the piston 12 is moved by the moving amount considering the deflection of the inner levers 20, whereby the fork 15 and the sleeve 16 are regulated to move by the predetermined moving amount.

As shown in the portion a3 of the curve A in FIG. 4, when the driving force drastically increases in an incredibly short time, a so called surge load is applied to the piston 12, the moving amount of the sleeve 16 detected by the position sensor 22 is equal to zero or approximately zero, but the load sensor 23 detects the driving force applied to the piston 12, whereby the converting portion 24 converts the surge load into the deflection of the inner levers 20. Therefore the deflection may be mistakenly estimated when the correcting portion 28 estimates the moving amount of the sleeve 16. In the regular shift operation, it is not possible for the driving force applied to the piston 12 to continuously increase in a short time. If the continuously increasing driving force in a short time is detected, the driving force will be determined to be a surge load. To prevent the moving amount from mistakenly being estimated, in this example a filter circuit can be disposed between the load sensor 23 and the converting portion 24, to cut out or filter an excessive electrical signal of a continuously increasing driving force in a short time so that such signal is not transmitted to the converting portion 24. The correction by the correcting portion 28 in the portion a3 in FIG. 4 also can be inhibited.

In this described embodiment, the moving amount of the sleeve 16 is estimated by subtracting the deflection of the inner levers 20 from the moving amount of the piston 12 detected by the position sensor 22 when the synchromesh-type automatic transmission is manufactured. Therefore it is not necessary to provide sensors on or adjacent the inner levers and/or the shift fork shaft 15 to accurately estimate the moving amount of the sleeve 16. Also, to convert the driving force supplied to the piston 12 into the deflection of the inner levers 20, the friction resistance of the piston 12 is subtracted from the output of the hydraulic cylinder 10, the map showing the relationship between the driving force and the deflection is used, and the filter circuit is provided for cutting or filtering out the excessive electrical signal associated with the surge load (e.g., as shown by the portion a3 in FIG. 4). Therefore the reliability of the conversion from the driving force into the deflection by the converting portion 24 is improved, whereby the reliability of the estimation of the moving amount of the sleeve 16 is further improved.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A shift actuating control system for a synchromesh-type automatic transmission comprising:
   a shift actuator having a driving portion activated depending on a shift operation;
   a shift fork shaft which moves a sleeve of a synchromesh mechanism in an axial direction when the shift fork shaft is engaged with the sleeve;
   a driving force transmitting member disposed between the driving portion and the shift fork shaft to transmit a driving force generated by the driving portion to the shift fork shaft;
   detecting means for detecting a deflection of the driving force transmitting member when the driving portion is activated; and
   control means for controlling the driving portion depending on the deflection detected by the detecting means.

2. The shift actuating control system for a synchromesh-type automatic transmission according to claim 1, wherein the detecting means is a first detecting means, and including second detecting means for detecting a moving amount of the driving portion when the shift fork shaft is moved.

3. The shift actuating control system for a synchromesh-type automatic transmission according to claim 2, wherein the first detecting means includes a detecting portion which detects the driving force applied to the driving portion and/or the driving force transmitting member, and a converting portion which converts the driving force detected by the detecting portion into deflection of the driving force transmitting member.

4. The shift actuating control system for a synchromesh-type automatic transmission according to claim 3, wherein the control means includes a correcting portion which corrects the moving amount of the driving portion detected by the second detecting means depending on the deflection of the driving force transmitting member determined by the converting portion of the first detecting means.

5. The shift actuating control system for a synchromesh-type automatic transmission according to claim 3, wherein the detecting portion of the first detecting means detects the driving force by subtracting a resistance from an output of the shift actuator.

6. The shift actuating control system for a synchromesh-type automatic transmission according to claim 3, wherein the converting portion of the first detecting means converts the driving force detected by the detecting portion into deflection of the driving force transmitting member using a map which converts the driving force to a corresponding deflection.

7. The shift actuating control system for a synchromesh-type automatic transmission according to claim 2, wherein the first detecting means includes a detecting portion which detects the driving force applied to the driving portion and/or the driving force transmitting member, and a converting portion which converts the driving force detected by the detecting portion into deflection of the driving force transmitting member.

8. A shift actuating control system for a synchromesh-type automatic transmission comprising:
   a shift actuator having a driving portion activated by shift operation to generate a driving force;
   a shift fork shaft which axially moves a sleeve;
   a driving force transmitting member disposed between the driving portion and the shift fork shaft to transmit the driving force generated by the driving portion to the shift fork shaft;
   a load sensor which detects the driving force transmitted by the driving portion to the shift fork shaft;
   converting means for converting the driving force detected by the load sensor to a deflection of the driving force transmitting member; and
   control means for controlling the shift actuator based on the deflection of the driving force transmitting member.

9. The shift actuating control system for a synchromesh-type automatic transmission according to claim 8, including second detecting means for detecting a moving amount of the driving portion when the shift fork shaft is moved.

10. The shift actuating control system for a synchromesh-type automatic transmission according to claim 9, wherein the control means includes a correcting portion which corrects the moving amount of the driving portion detected by the second detecting means depending on the deflection of the driving force transmitting member determined by the converting means.

11. The shift actuating control system for a synchromesh-type automatic transmission according to claim 8, including correcting means for correcting the driving force detected by the load sensor by subtracting a frictional resistance from an output of the shift actuator.

12. A method of controlling shift actuation in a synchromesh-type automatic transmission that is comprised of a shift actuator having a driving portion activated by shift operation to generate a driving force, a shift fork shaft which moves a sleeve, and a driving force transmitting member disposed between the driving portion and the shift fork shaft to transmit the driving force generated by the driving portion to the shift fork shaft, the method comprising:
   detecting a deflection of the driving force transmitting member when the driving portion is activated; and
   controlling the driving portion based on the detected deflection.

13. The method according to claim 12, including detecting a moving amount of the driving portion when the shift fork shaft is moved.

14. The method according to claim 12, wherein the detection of the deflection of the driving force transmitting member includes detecting the driving force applied to the driving portion and/or the driving force transmitting member.

15. The method according to claim 14, wherein the detection of the deflection of the driving force transmitting member also includes converting the driving force detected by the detecting portion into deflection of the driving force transmitting member.

16. The method according to claim 15, wherein the converting of the driving force into deflection of the driving force transmitting member is performed using a map which converts the driving force to a corresponding deflection.

17. The method according to claim 12, including detecting a moving amount of the driving portion when the shift fork shaft is moved, and correcting the moving amount of the driving portion based on the detected deflection.

18. The method according to claim 12, wherein the driving force is detected by subtracting a frictional resistance from an output of the shift actuator.

* * * * *